United States Patent [19]

Cavanaugh

[11] Patent Number: 5,655,778

[45] Date of Patent: Aug. 12, 1997

[54] BELLOWS SELF-THREADING SEAL

[75] Inventor: James E. Cavanaugh, Cottage Grove, Oreg.

[73] Assignee: Binks Manufacturing Company, Franklin Park, Ill.

[21] Appl. No.: 697,771

[22] Filed: Aug. 30, 1996

[51] Int. Cl.[6] .................... F16J 15/52; F16B 7/18
[52] U.S. Cl. ................ 277/1; 277/9; 277/212 FB; 403/51; 403/282
[58] Field of Search ................ 277/1, 212 FB, 277/9, 11, 212 R, 101, 110; 411/427, 970, DIG. 1; 403/50, 51, 274, 281, 282, 341, 370

[56] References Cited

U.S. PATENT DOCUMENTS

| | | | |
|---|---|---|---|
| 1,397,413 | 11/1921 | Evans | 403/51 |
| 1,885,121 | 11/1932 | Loweke | 403/51 |
| 2,290,776 | 7/1942 | Stillwagon, Jr. | 403/50 |
| 2,473,618 | 6/1949 | Stillwagon, Jr. | 403/51 |
| 2,492,030 | 12/1949 | Beekley | 403/51 |
| 3,387,870 | 6/1968 | Gottschald et al. | 403/51 |
| 4,508,018 | 4/1985 | Choinski et al. | 403/51 |
| 4,936,811 | 6/1990 | Baker | 277/212 FVB |
| 5,152,540 | 10/1992 | Kuze | 403/50 |
| 5,415,531 | 5/1995 | Cavanaugh | 277/212 FB |
| 5,498,076 | 3/1996 | Krzywdziak | 277/212 FB |

*Primary Examiner*—William A. Cuchlinski, Jr.
*Assistant Examiner*—John L. Beres
*Attorney, Agent, or Firm*—David O'Reilly

[57] ABSTRACT

A method and apparatus for improving a seal of a pliant tubular member on a cylindrical shaft. The seal is in the form of an articulating seal member positioned on a piston rod of a reciprocating pump and in this invention, is for use in a system that has dual in-line reciprocating pumps. The articulating seal has a tubular end positioned over circumferential grooves on each piston rod of the dual acting piston pump. To provide a tight, intimate seal relationship of the tubular end of the articulating seal with the piston rod, a self-threading member is threaded over the pliant tubular end to crush and deform the pliant tubular end into the circumferential grooves.

13 Claims, 3 Drawing Sheets

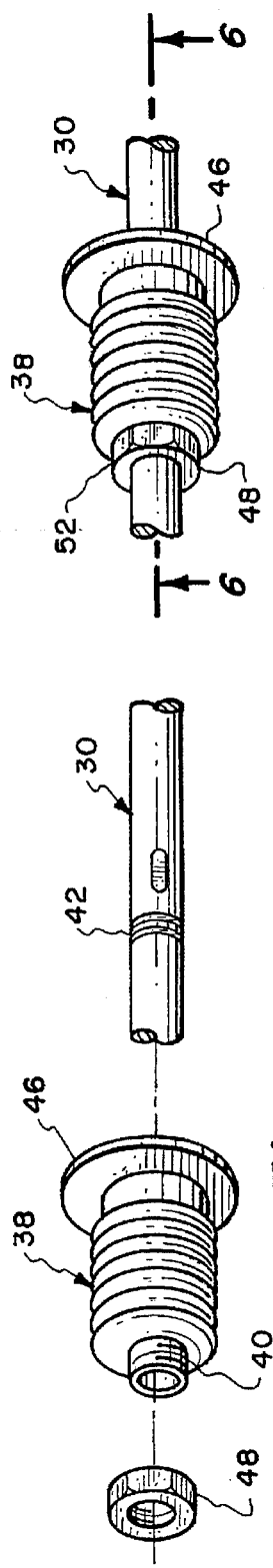
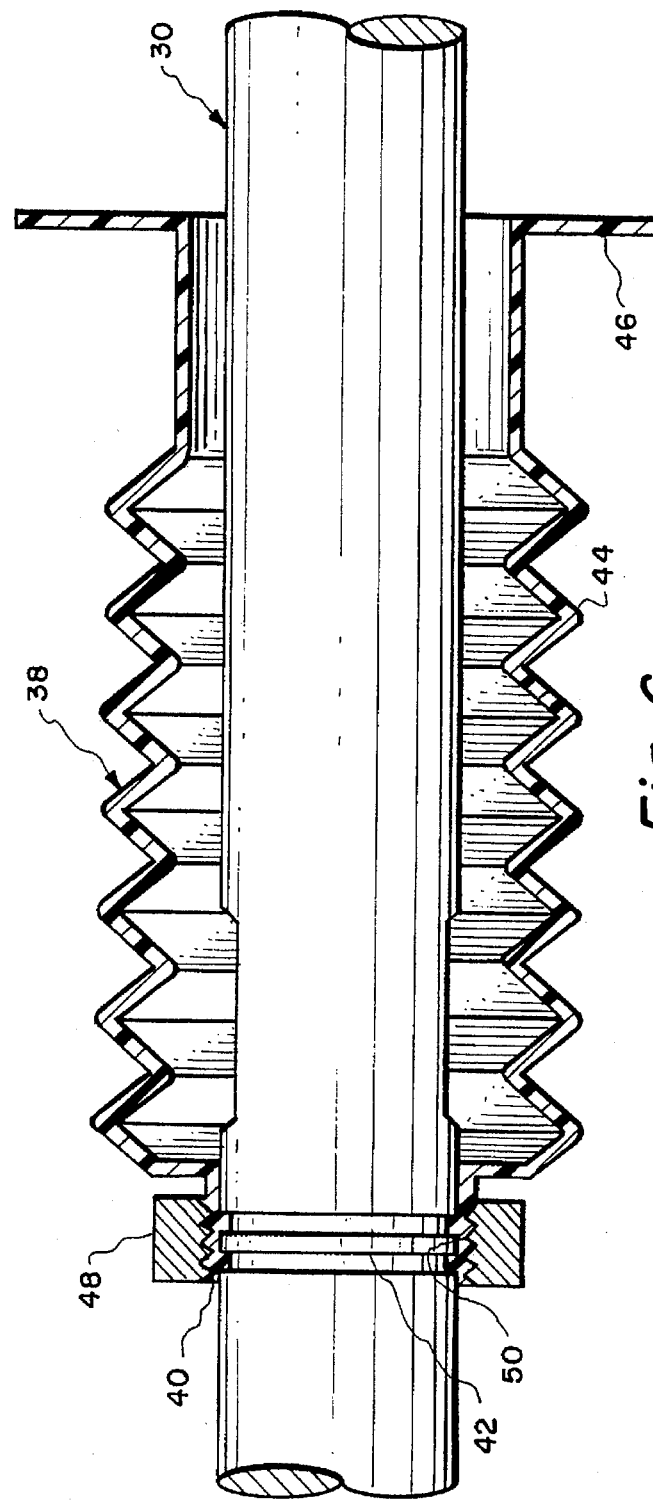

BELLOWS SELF-THREADING SEAL

BACKGROUND OF THE INVENTION

1. Field of the Invention

The present invention relates to an improved seal for a piston pump and more particularly, relates to a self-threading seal for sealing a pliant deformable tube to a cylindrical shaft.

2. Background Information

An improved pump that uses the type of seal of this invention is disclosed and described in U.S. Pat. No. 5,415,531 to Cavanaugh dated May 16, 1995, which is an improvement to a pump assembly of the general type disclosed and described in U.S. Pat. No. 5,094,596 of Erwin, Cavanaugh and Hetherington issued in March 1992. The pump of the '531 patent provides a new combination of structural features that together produce an enhanced operational performance. This patent describes a pump assembly that has a dynamic block and output block defining a dynamic chamber and pumping chamber respectively. The dynamic block abuts the output block such that cylindrical peripheral wall of the dynamic chamber is coaxial with, and substantially the same diameter as the cylindrical peripheral wall of the pumping chamber.

The pump assemblies of this patent is comprised of a pair of opposing single-acting, piston pumps operating alternately by means of an interposed actuator such as a fluid actuating air motor isolated from the fluent material by an actuating seal. An annular seal is clamped between the outlet block and the dynamic block on either side of the pump, and extends radially inwardly into engagement with the periphery of the piston. The annular seal is in continuous engagement with the periphery of the piston, and remains spaced from all other surfaces within the pump to minimize wear.

The piston rod is provided with annular grooves that are positioned within the dynamic chambers on either side of the pump. The articulating seal is a movable seal member, preferably a bellows seal, sealingly engaged in the annular grooves of the piston rod. A second end of the articulating movable seal member, sealingly engages the dynamic chamber end wall. An isolation chamber, located between the dynamic chamber and seal assembly of the actuator, isolates and drains away any motor fluid such as air or hydraulic fluid, which might pass through the seal assembly.

The articulating movable sealing member isolates the dynamic chambers from the actuator and the interior of the seal is vented via the isolation chamber so the seal may move without restriction. That is, the bellows seal may readily expand and contract. The seal member thereby, seals the piston rod to the side of the chamber and end wall and creates a sealed dynamic chamber.

The articulate bellows seal of the patent has a cylindrical end having an inner diameter equal to the outer diameter of the piston rod, and positioned about the rod to overlay a pair of annular grooves formed in the circumference of the rod. A clamp, such as a base clamp, is provided to clamp the tubular .cylindrical end of the seal around the piston rod. The annular grooves are formed in the circumference of the piston rod to be in the dynamic chamber. The cylindrical end of the bellows seal, positioned about the annular grooves, is partially forced into the grooves by the clamp to fixedly secure the cylindrical end to the piston rod providing a seal.

However, a problem with the seal provided between the tubular cylindrical end of the bellows seal and the hose clamp is that after periods of use, the hose clamp can become loose causing the seal to fail and requiring maintenance of the pump. This maintenance occurs much too frequent and requires replacement of the clamp and seal to correct the problem. It would be advantageous if a seal could be provided that would not deteriorate over a long period of use.

Therefore, it is one object of the present invention to provide an improved seal.

Yet another object of the present invention is to provide an improved seal between a cylindrical shaft and a pliant tubular member.

Still another object of the present invention is to provide an improved method of sealing a pliant tubular member against a cylindrical shaft.

Yet another object of the present invention is to provide an improved seal for an articulating seal in a pump.

Still another object of the present invention is to provide an improved seal between a reciprocating piston rod and an articulating seal having a pliant tubular end.

Yet another object of the present invention is to provide an improved seal between a reciprocating piston rod having a plurality of circumferential grooves, and an articulating seal having a pliant tubular end positioned over the plurality of circumferential grooves and set by a self-threading member.

Yet another object of the present invention is to provide an improved seal between a reciprocating piston rod having a pair of circumferential grooves, and an articulating seal having a pliant tubular end by threading a coarse self-threaded nut over the pliant tubular end to deform the pliant tubular end into the circumferential grooves.

BRIEF DESCRIPTION OF THE INVENTION

The purpose of the present invention is to provide an improved seal for a piston pump for pumping fluent materials.

The invention disclosed herein is specifically to improve the pump assembly disclosed in U.S. Pat. No. 5,415,535 of Cavanaugh, issued May 16, 1995 incorporated herein by reference, and corresponding pump assembly such as the pump assembly disclosed in U.S. Pat. No. 5,094,596, also incorporated herein by reference. The improved pump assembly incorporates many of the elements of the aforementioned pumps, including the same air motor, piston configuration and sealed pumping chamber. The invention disclosed and described herein resides in a new improved seal for the dual reciprocating pumps, and an improved seal for sealing a pliant tubular member to a cylindrical rod.

According to the present invention, the pump assembly includes a dynamic chamber and a pumping chamber having inlets and outlets. A reciprocal air motor, adjacent to the dynamic chamber, having a short reciprocatory stroke, drives a reciprocating piston within the pumping chamber and the dynamic chamber. As in the aforementioned patents, the piston is of smaller diameter than the peripheral walls of the pumping chamber and dynamic chamber so as to create an inwardly spaced gap relation thereto. The dynamic chamber has an end wall separating the actuator from the dynamic chamber through which a piston rod extends from the piston through an orifice in the end wall dynamic chamber to the actuator for coupling the piston with the actuator for imparting short reciprocal strokes movements to the piston. The piston is sealed by an annular seal that extends radially inwardly into engagement with the periphery of the piston. The periphery of the piston is in continuous engagement with the seal, and remains spaced from all other surfaces within the pump to minimize wear.

The piston rod is further provided with annular grooves so that the annular grooves are positioned within the dynamic chamber. A first pliant tubular end of an articulating movable seal member, preferably a bellows seal, is sealingly engaged in the annular grooves of the piston rod while a second end of the articulating movable seal member sealingly engages the dynamic chamber end wall. The articulating movable seal member isolates the dynamic chamber from the actuator, which is vented so that the bellows may readily expand and contract.

The articulating seal pliant tubular end is positioned over a plurality of circumferential grooves in the piston rod that are positioned in the dynamic chamber. The pump of the prior patent referred to hereinabove, has a problem of the seal failing when the hose clamp loosens after a period of use. This requires maintenance of the pump to correct the failed seal by replacing the clamp and the articulating seal.

To eliminate this problem, the bellows seal has a pliant tubular end positioned over the circumferential annular groove that is secured by a self-threaded member, tightened around the pliant tubular end to force the material into the circumferential grooves. Preferably, the threaded member is in the form of a nut having coarse threads with an inner diameter only slightly larger than the outer diameter of the piston rod. With the pliant tubular end of the bellows seal positioned over the circumferential groove, the nut is tightened around the pliant tubular end to deform and force the material into the grooves providing a secure, tight seal.

The above and other novel features of the invention will be more fully understood from the following detailed description and the accompanying drawings, in which:

BRIEF DESCRIPTION OF THE DRAWINGS

FIG. 4 is an exploded view of a pump piston rod, articulating seal and a threaded sealing member to seal the articulated seal on the piston rod.

FIG. 5 is a perspective view of the articulating seal mounted on a piston rod and sealed by the threaded sealing member.

FIG. 6 is a sectional view taken at 6—6 of FIG. 5.

DETAILED DESCRIPTION OF THE INVENTION

Figure 1:
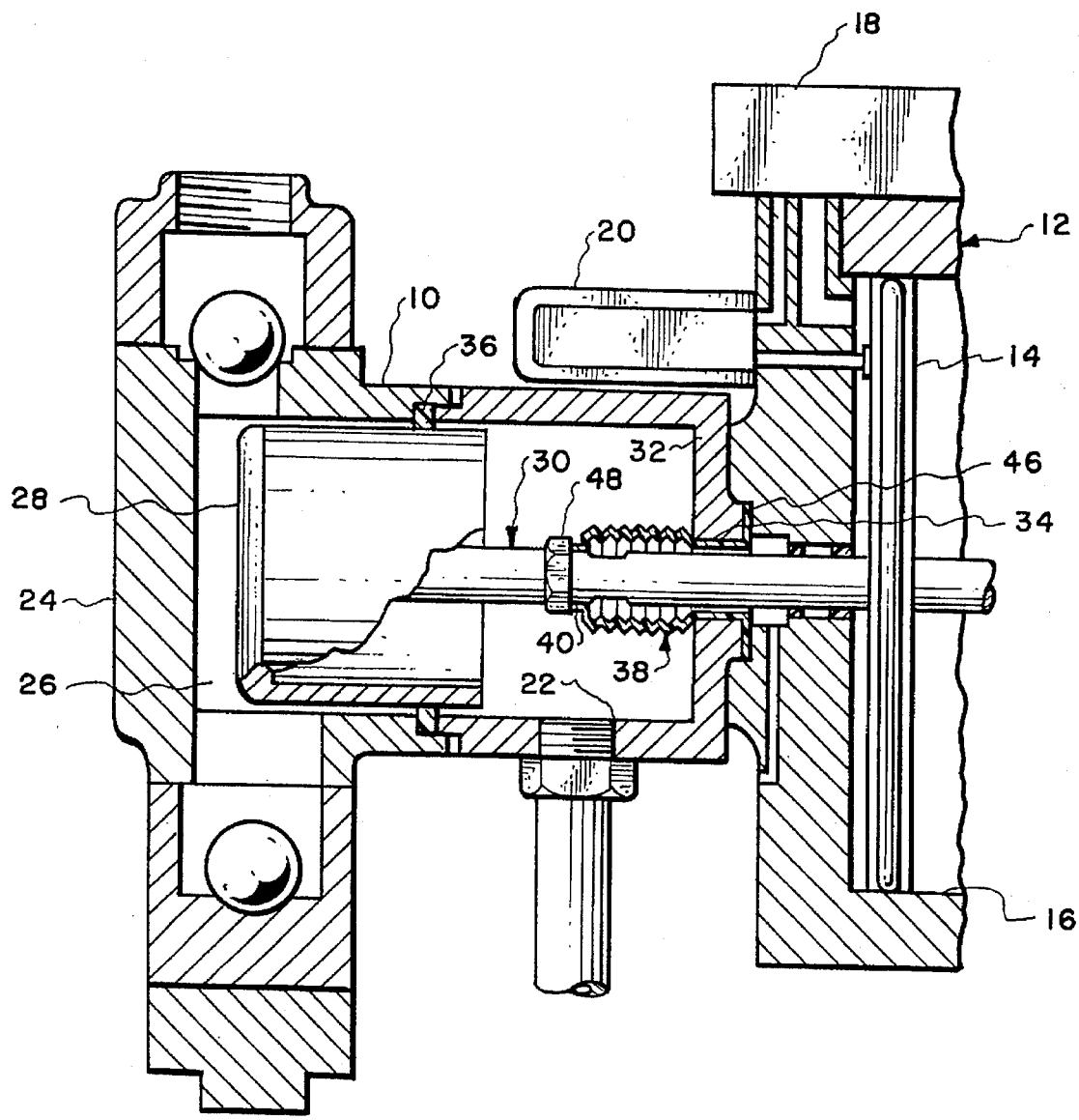
FIG. 1 is a vertical longitudinal sectional view on an enlarged scale of one of the single acting pumps incorporated in the dual pump assembly.

One of the single acting pumps of the pump assembly disclosed in the U.S. Pat. No. 5,415,531 is illustrated in FIG. 1. The following is a description of the best mode presently conceived by the inventor for carrying out the invention.

Referring to FIG. 1, the pump assembly of the invention is generally oriented with its axis of reciprocation horizontal. The pump assembly is comprised of a central actuator 12 and a pair of piston pumps such as the piston pump 10 on opposite sides of actuator 12. Actuator 12 is a dual acting reciprocating motor having a piston 14.

Generally, actuator 12 will be an air operated motor of a type well-known in the art. Air actuated motor 12 generally has a cylinder 16 having a larger diameter than the pump pistons and a piston 14 reciprocal therein, and having a sealing relationship with the peripheral wall of cylinder 16. Air control valve 18 supplies compressed air alternately to opposite sides of piston 14 and includes a pilot valve 20 actuated by piston 14. Pump 10, as shown in FIG. 1, is comprised of a dynamic chamber 22 connected to an outlet block 24, having a pumping chamber 26. Piston 28 is reciprocal within dynamic and pumping chambers 22 and 26, and is driven by piston rod 30 extending through end wall 32 to air motor piston 14 thereby, coupling pump piston 28 to motor piston for mutual reciprocation.

Piston 28 is smaller in diameter than chambers 22 and 26 so that there is no metal contact between piston 28 and the walls of chambers, and fluent material to be pumped may enter into pumping chamber 26. The axial alignment of piston 28 and piston rod 30 is provided by seal assembly 34 in end wall 32, and peripheral seal 36 between dynamic chamber 22 and pumping chamber 26. The operation of the pump is as described in U.S. Pat. No. 5,015,531 incorporated herein by reference.

An important feature of the pump construction is in the use of an articulating movable seal member 38, between end wall 32 of dynamic chamber 22 and piston rod 30. Bellows seal 38 has a pliant cylindrical tubular end 40 having an inner diameter equal to the outer diameter of piston rod 30, and is positioned about piston rod 30 to overlie a pair of circumferential annular grooves 42 and best illustrated in FIGS. 2 and 3.

Figure 2:
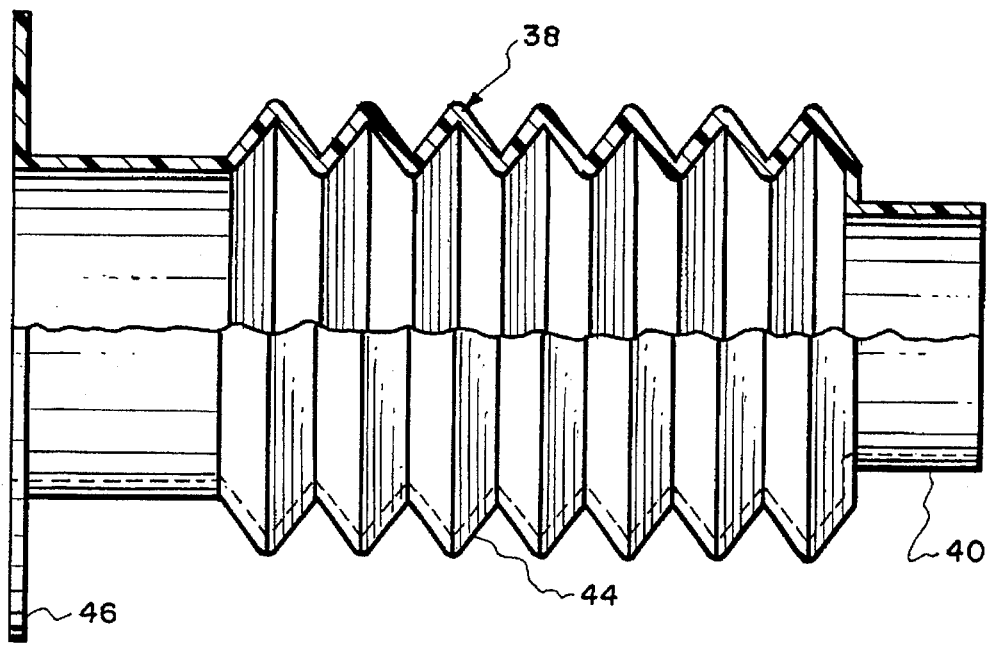
FIG. 2 is a fragmentary longitudinal sectional view on a greatly enlarged scale of an articulating movable seal member incorporated in a pump assembly of FIG. 2.

Articulating seal 38 is illustrated in the partial section of FIG. 2, and is preferably of a bellows construction having compressible convolutions 44 in a center portion, a sealing flange 46 for sealing against end wall 32 of the dynamic chamber 22 and a pliant tubular cylindrical end 40 for sealing the articulating seal against piston rod 30. Preferably, bellows seal is constructed entirely of a pliant plastic material.

Figure 3:
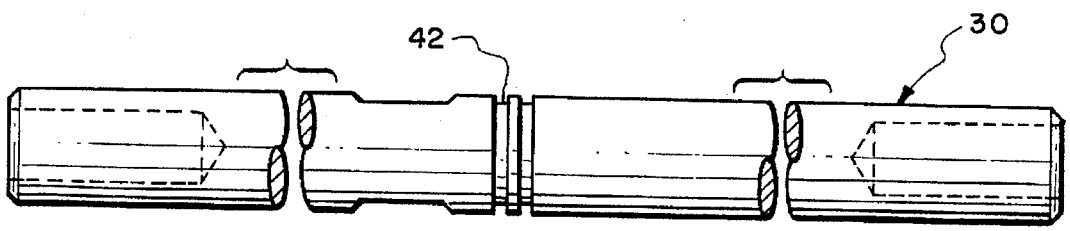
FIG. 3 is a plain view, on an enlarged scale, of a piston rod used in the pump assembly of FIG. 1.

As shown in FIG. 3, piston rod 30 is attached to piston 28 at one end and to piston 14 in air motor 12. Piston 30 has a pair of circumferential annular grooves 42 for sealing pliant tubular end 40 of bellows seal 38. Articulating bellows seal 38 is mounted between air motor 18 and end wall 32 of pump 10 with flange 46 securely clamped in place to provide a seal. Pliant tubular end 40 of bellows seal 38 is securely fastened to piston rod and sealed by a self-threading nut 48, threaded over pliant tubular end 40. The threads on nut 48 "crush" and deform pliant tubular end 40 forcing the pliant material into circumferential annular grooves 42.

The articulated seal 38 is mounted on piston rod 30 and sealed as illustrated in FIGS. 4 through 6. Piston rod, having circumferential cylindrical grooves 42, is inserted into articulating bellows seal 38 with the piston passing through pliant tubular end 40 until the pliant tubular end is positioned over the circumferential grooves. Self-threading member or nut 48 is then tightened down on pliant tubular end 40 to crush the pliant material and force it into the circumferential grooves 42 as illustrated in FIG. 6. The secure clamping action of threaded member or nut 48 securely clamps pliant tubular end on articulating seal 38 onto piston rod 30 and will not loosen over a significant period of use of the dual reciprocating pumps.

Threaded member or nut 48 preferably has an inner diameter that is slightly larger than the outer diameter of piston rod 30, but is significantly less than the outer diameter of pliant tubular end of articulating seal 34. Course threads 50, in self-threading nut 48, threaded over and crush pliant material in pliant tubular end 40 of articulating seal 38 forcing it into the circumferential annular grooves 42. Preferably, threaded member 48 is a threaded nut having flats 52 so that the threaded member may be securely tightened with a wrench on the pliant tubular end 40 of articulating member 38.

Thus, there has been disclosed a unique method of sealing a pliant tubular member against a cylindrical shaft. In the embodiments disclosed, the pliant tubular member is a pliant tubular end on am articulating seal positioned over a piston rod. The piston rod is provided with a plurality of circumferential grooves. A threaded nut is threaded over the pliant tubular end of the articulating seal, crushing the pliant tubular end and forcing the material into the circumferential annular grooves to provide a secure intimate, tight seal between the articulating seal and the piston rod.

Obviously, many modifications and variations of the invention are possible in light of the above teachings. It is therefore, to be understood, that the full scope of the invention is not limited in details disclosed herein, but may be practiced otherwise in as specifically described.

This invention is not to be limited by the embodiment shown in the drawings and described in the description which is given by way of example and not of limitation, but only in accordance with the scope of the appended claims.

What is claimed is:

1. In a pump assembly for pumping fluent materials having a pumping chamber; an inlet to said pumping chamber; an outlet for said pumping chamber; a piston reciprocal in said pumping chamber; and a piston rod on said piston, the improvement comprising;

a plurality of circumferential grooves on said piston rod;

an articulating movable seal having a pliant tubular end sealingly positioned on said piston rod over said plurality of circumferential grooves and a second end sealingly engaged with an end wall of an inlet chamber;

self-threading means threaded over said pliant tubular end of said articulating seal to deform said pliant tubular end into said plurality of grooves;

whereby said articulating movable seal is securely sealingly clamped on said piston rod.

2. The pump assembly according to claim 1 wherein said plurality of circumferential grooves comprises a pair of circumferential grooves.

3. The pump assembly according to claim 2 wherein said threaded means comprises a self-threading nut; said self-threading nut being threaded over said pliant tubular end of said articulating seal to deform said pliant tubular end into said pair of circumferential grooves.

4. The pump assembly according to claim 3 wherein said self-threading nut has an inner diameter substantially equal to the outer diameter of said piston rod and less than the outer diameters of said pliant tubular end of said articulating seal.

5. A seal assembly for sealing a pliant tubular member on a cylindrical shaft comprising;

a plurality of circumferential grooves on said cylindrical shaft;

said pliant tubular member being positioned on said cylindrical shaft over said plurality of grooves;

self-threading means threaded on said pliant tubular member, said self-threading means deforming said pliant tubular member into said plurality of grooves;

whereby a tight, secure seal is formed between said pliant tubular member and said cylindrical shaft.

6. The seal assembly according to claim 5 wherein said plurality of circumferential grooves comprise a pair of grooves.

7. The seal assembly according to claim 6 wherein said threaded means comprises a self-threading nut; said self-threading nut being threaded onto said pliant tubular member to deform said pliant tubular member into said pair of grooves.

8. The seal assembly according to claim 7 wherein said cylindrical shaft comprises a pump piston rod.

9. The seal assembly according to claim 8 wherein said pliant tubular member comprises an articulating seal having a pliant tubular end, said pliant tubular end being positioned over said circumferential grooves on said piston rod.

10. The seal assembly according to claim 9 wherein said articulating seal comprises a bellows seal.

11. A method of forming a seal on a cylindrical shaft comprising;

cutting a plurality of circumferential grooves in said cylindrical shaft;

positioning a pliant tubular member over said plurality of grooves;

threading a self-threading member onto said cylindrical shaft over said pliant tubular member to deform said tubular member into said plurality of grooves.

12. The method according to claim 11 comprising a pair of cylindrical grooves in said cylindrical shaft.

13. The method according to claim 12 comprising forming said pliant tubular member on an articulating seal.

* * * * *